United States Patent [19]

Hirano et al.

[11] Patent Number: 6,074,300
[45] Date of Patent: Jun. 13, 2000

[54] VIDEO SIGNAL REPRODUCING APPARATUS

[75] Inventors: Tetsuya Hirano, Kanagawa; Hisayuki Kunigita; Shinichi Okamoto, both of Tokyo; Shinji Noda, Chiba; Teiji Yutaka, Kanagawa, all of Japan

[73] Assignee: Sony Corporation, Tokyo, Japan

[21] Appl. No.: 08/747,538

[22] Filed: Nov. 12, 1996

Related U.S. Application Data

[62] Division of application No. 08/454,837, May 31, 1995, Pat. No. 5,791,994.

[30] Foreign Application Priority Data

Jun. 1, 1994 [JP] Japan .................................. 6-142154

[51] Int. Cl.[7] .................................................. A63F 9/24
[52] U.S. Cl. .............................. 463/43; 711/5; 711/115
[58] Field of Search ........................... 463/43, 44; 711/4, 711/5, 114, 115, 170, 171, 172, 202

[56] References Cited

U.S. PATENT DOCUMENTS

| 5,241,663 | 8/1993 | Rohwer .................................... 711/115 |
| 5,333,315 | 7/1994 | Saether et al. ............................ 395/675 |

OTHER PUBLICATIONS

Declaration referring to PKZIP and webpages available at http://www.pkware.com, Sep. 1998.

*Primary Examiner*—Jessica J. Harrison
*Attorney, Agent, or Firm*—Frommer Lawrence & Haug, LLP.; William S. Frommer

[57] ABSTRACT

In a video reproducing apparatus, operating devices and recording devices are connected with a simple structure to record game information while operating the game, and a plurality of small capacity of external secondary memory means can be used as a large capacity of external secondary memory means. The main body of the video game machine is connected to a plurality of the operating devices with a serial interface so that serial data is communicated bidirectionally in accordance with a predetermined communication procedure while at the same time connecting recording devices to the serial interface respectively corresponding to a plurality of operating devices to allow the main body of the game machine to write predetermined data into and read it from recording devices in accordance with a communication procedure. Moreover, the communication controller connected to the main bus to which the central processing unit of the main body of the machine is connected and a plurality of card connectors namely card slots where memory cards connected to the main bus via the communication controller are attached to or detached from freely are provided, and each card slot is independently controlled by the central processing unit via the communication controller to control the writing and/or reading of data extending over the plurality of external secondary memory means.

4 Claims, 10 Drawing Sheets

VIDEO SIGNAL REPRODUCING APPARATUS

This application is a division of application Ser. No. 08/454,837, filed May 31. 1995, now U.S. Pat. No. 5,791,994.

BACKGROUND OF THE INVENTION

1. Field of the Invention

This invention relates to a video signal reproducing apparatus, and more particularly to a video game machine in which, for example, a game content stored in a CD-ROM is processed at operating devices while displaying the content on a display so as to perform the game.

2. Description of the Related Art

Heretofore, there are video game machines in which a game content stored in a video recording medium such a CD-ROM or the like is processed with an operating device while being displayed on a TV set so as to perform the game. The main body of the game machine in this kind of video game machine is normally connected to an operating device with a serial interface. A simple communication procedure is used for sending key switch information or the like which respond to an operation of users who operate the operating device in synchronization with a clock which is sent from the main body of the video game machine to the processor.

However, some of these kinds of video game are so constituted to record the state of the game in a recording device with respect to a game which has become so complicated that it takes a long time to complete the game. It is considered that the recording device or the like is connected to a serial interface to which the processor is connected. However, the game machine is constituted so that key switch information is fetched from the processor with a simple communication procedure. Thus connecting the recording device to the serial interface is impossible in practical terms. It has been impossible to read data from or write it into the recording device while playing the game at the same time.

Further, it is considered that the main body of the game machine is directly connected to the recording device with a memory signal line used in the recording device. However, there arises a problem in that such a constitution will result in an increased number of connection signal lines of the recording device and the connection part will be complicated. In addition, due to such a connection method, it has been impossible to detach or attach the recording device with turning on the power supply of the main body of the game machine.

SUMMARY OF THE INVENTION

In view of the foregoing, an object of this invention is to provide a video signal reproducing apparatus which connects the main body of the video game machine, operating devices and the recording device with a simple structure and which is capable of recording the game data simultaneous when needed while operating the game.

The foregoing object and other objects of the invention have been achieved by the provision of a video signal reproducing apparatus having a reproduction function of a video recording medium, for performing a game by an operation of a plurality of operating devices connected to the main body of the game machine provided with a central processing unit, in which: the operating devices are also provided with a central processing unit; the main body of the game machine and the plurality of operating devices are connected with a serial interface; serial data is bidirectionally communicated between the main body of the game machine and the plurality of operating devices in accordance with a predetermined communication procedure; the central processing unit and recording devices having a memory are connected to the serial interfaces respectively corresponding to each of the plurality of operating devices; and the main body of the machine writes predetermined data in and reads it from the recording devices in accordance with a communication procedure.

The main body of the video game machine and a plurality of operating devices are connected with a serial interface to communicate serial data bidirectionally in accordance with a predetermined communication procedure. At the same time, a plurality of recording devices are connected to the serial interfaces respectively corresponding to a plurality of operating devices so that the main body of the game machine writes predetermined data in and read it from the recording devices in accordance with a communication procedure thereby connecting the main body of the video game machine, operating devices and recording devices with a simple structure to record the game data at the same time when needed while playing the game.

As described above, the main body of the video game machine is connected to a plurality of operating devices with a serial interface to communicate the serial data bidirectionally in accordance with a predetermined communication procedure, and recording devices are connected to the serial interfaces respectively corresponding to a plurality of operating devices so that the main body of the game machine writes predetermined data in and read it from the recording devices in accordance with a communication procedure thereby realizing a video game machine that can connect the main body of the video game machine to the operating devices and the recording devices with a simple structure to enable recording data during game operation.

Further, in the video game machine according to this invention, a plurality of slots to which a plurality of external secondary memory means are connected are independently controlled by the central processing unit via the communication controller connected to the main bus to control the writing and reading of the data extending over the plurality of external secondary memory means, so that a plurality of small volume external secondary memory means can be used as a large volume external secondary memory means thereby enabling backing up game software or the like having a large data volume extending over a plurality of external secondary memory means.

In addition, in the video game machine according to this invention, a plurality of slots to which a plurality of external secondary memory means are connected are independently controlled by the central processing unit via the communication controller connected to the main bus, so that data can be directly copied between the plurality of external secondary memory means. In addition, each data can be directly taken in from the plurality of external secondary memory means into the main body of the machine.

Further, in the video game machine according to this invention, since game data can be secondarily memorized by the external secondary memory means comprising a flash memory connected to the slot so that data can be stored semi-permanently.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Entire Structure of Video Game Machine

Figure 1:
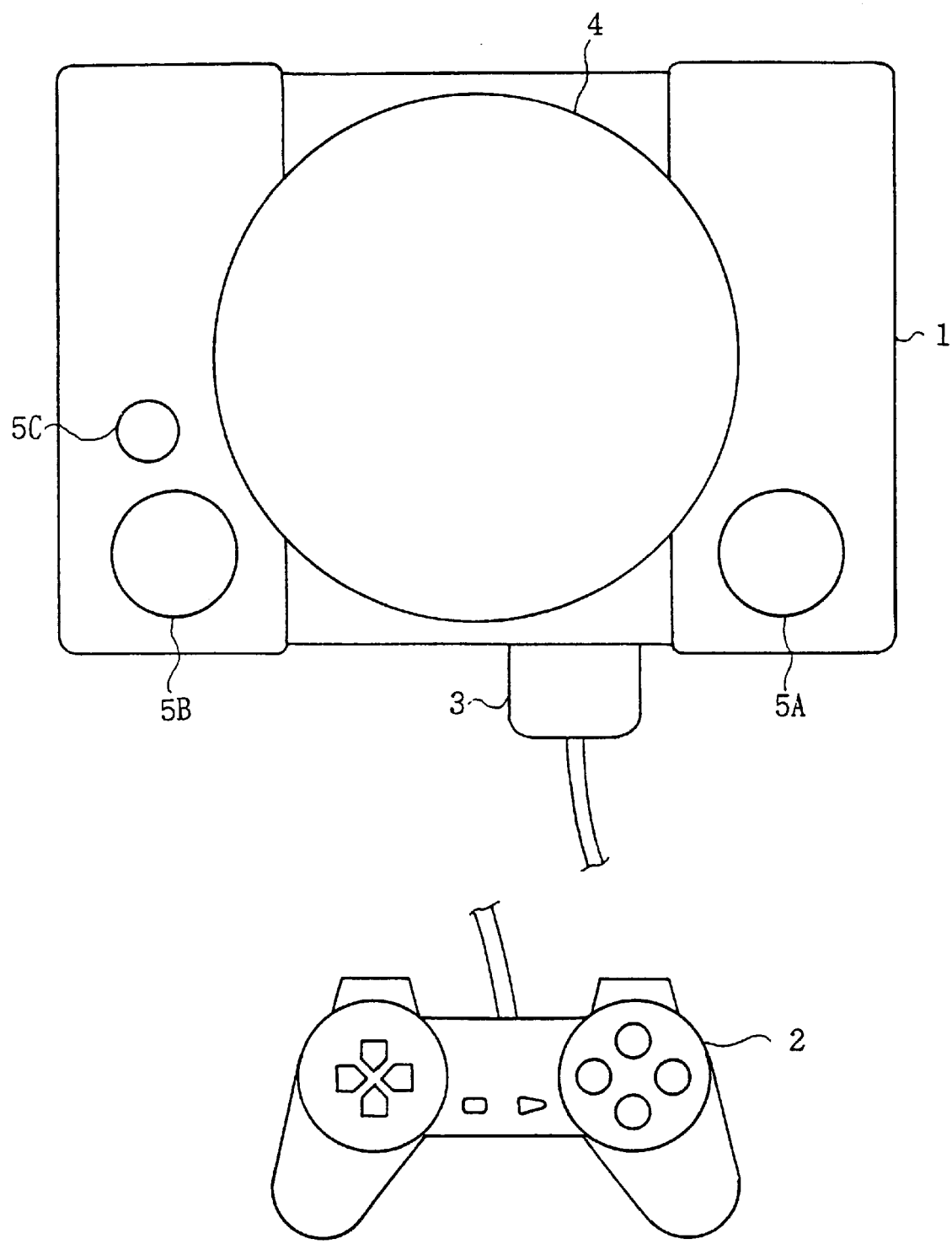
FIG. 1 is a plane view showing an external appearance of a video game machine according to this invention.
Figure 2A:
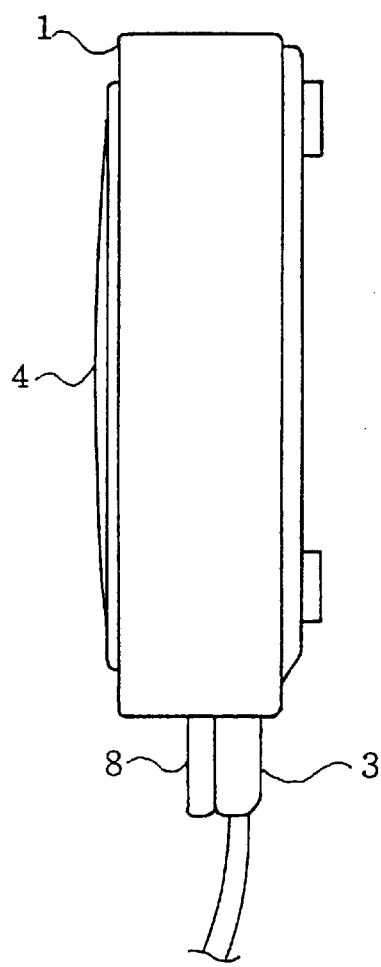
FIGS. 2A and 2B are a side view and a front view showing an external appearance of the video game machine according to this invention.
Figure 2B:
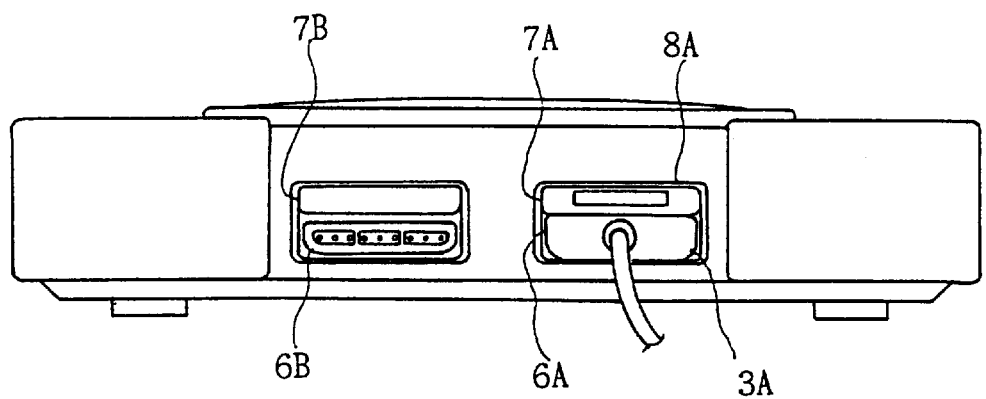

FIGS. 1, 2A, and 2B show an external structure of a video game machine as a whole. An operating device 2 is connected to the main body 1 of the game machine via a connector 3. The main body 1 of the game machine incorporates a CD-ROM drive for reproducing a CD-ROM. On the upper surface of the CD-ROM drive, there provided a lid 4 of the CD-ROM drive, an open/close switch 5A for opening and closing the lid 4, a power source 5B, a reset 5C or the like.

The video game machine is constituted so that two operating devices 2 are connected to the main body 1 of the game machine respectively via a connector 3. For this purpose, on the front surface of the main body 1 thereof, connecting parts 6A and 6B are respectively arranged for use in the connector 3. Further, in the case of the main body 1 of the game machine, connecting parts 7A and 7B are arranged adjacent to the connecting parts 6A and 6B. By connecting the connecting parts 7A and 7B to recording devices 8, game data for each of the operating devices 2 are recorded at every occasion.

Figure 3:
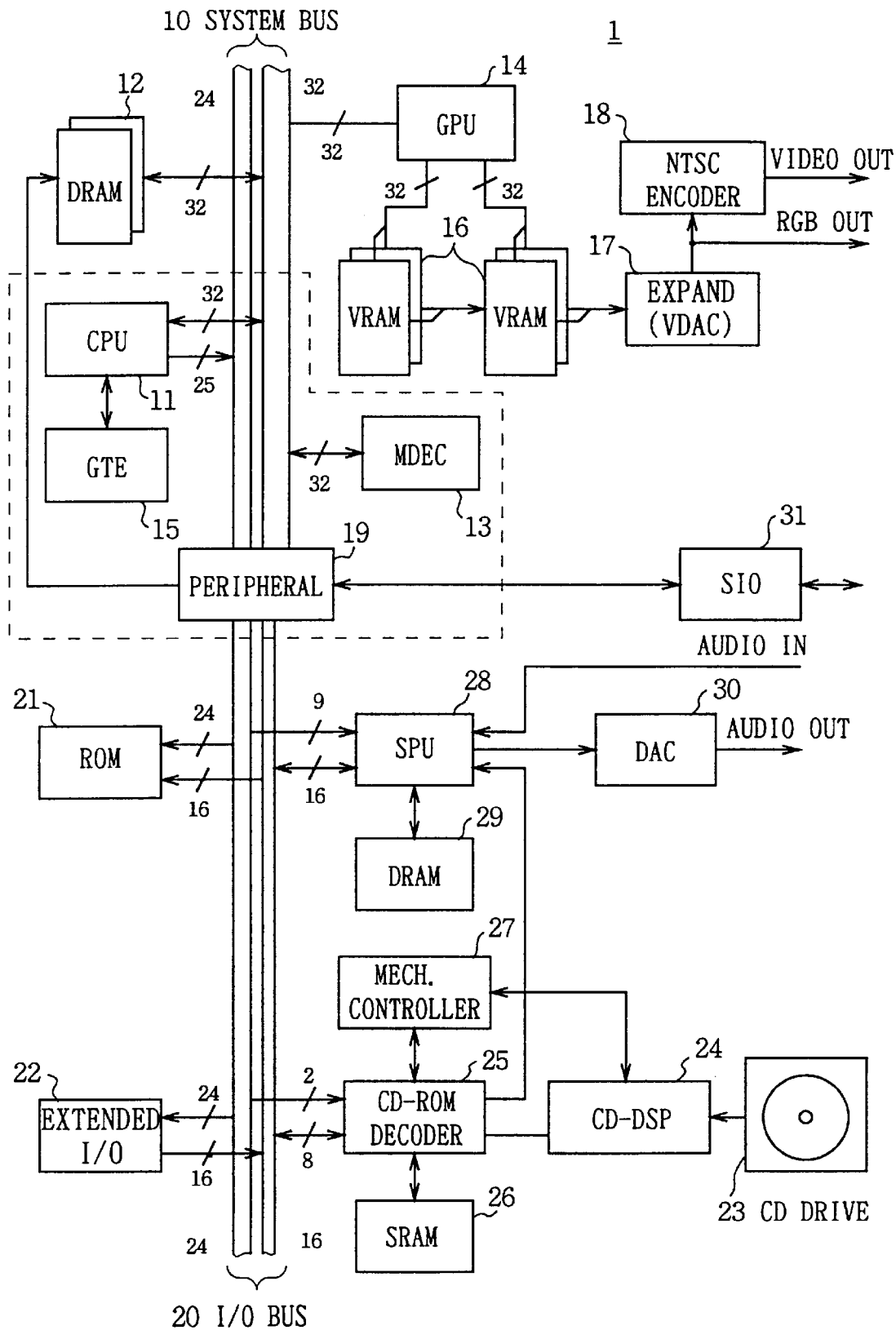
FIG. 3 is a block diagram showing an entire structure of the video game machine according to this invention.

The main body 1 of the game machine described herein is constituted as shown in FIG. 3. CPU 11, DRAM 12, MDEC 13, GPU (Graphic Processing Unit) 14 and the like are respectively connected to a system bus 10 comprising a 24-bit wide address and 32-bit wide data. Further, the GTE (Geometric Transfer Engine) 15 is DMA connected to the CPU 11.

Out of the components described above, the MDEC 13 is a processor for reproducing a motion picture, the processor developing a motion picture read from the CD-ROM. Further, the GTE 15 is a processor exclusively used with graphics. The processor comprises a plurality of computing parts which performs parallel processing. The processor performs parallel processing of coordinate transformation and rendering with respect to image data developed by the MDEC 13.

The GPU 14 is a processor exclusively used with graphics like GTE 15. On the basis of data that has been coordinate transformed and computed at the GTE 15, the GPU 14 contributes to actual depiction of images such as shading, texture mapping, and raster processing. The resulting image data is sent to an expanding device 17 including an VDAC via a VRAM 16. The expanding device 17 expands the image data, and digital-to-analog converts the data, so that the resulting image signal is output as an RGB signal, and at the same time the resulting image signal is input to an NTSC encoder 18 to be output as an NTSC style video signal.

In addition, from a peripheral 19 connected to one end of a system bus 10, an I/O bus 20 is formed comprising a 24-bit wide address and a 16-bit wide data. To this I/O bus 20, a ROM 21 storing a boot program and an extended I/O interface 22 are connected. Further, to this I/O bus 20, a CD drive 23 is connected via a CD-DSP 24 and a CD-ROM decoder 25.

To this CD-ROM decoder 25, an SRAM 26, a mechanical controller 27 are connected to send decoded image data to the I/O bus 20 and to send sound data to an SPU (Sound Processing Unit) 28. The SPU 28 is a processor for sound process. The SPU 28 decodes the sound data decoded at the CD-ROM decoder 25 with the DRAM 29 connected so that the resulting sound data is D/A converted at a DAC 30 to be output as an audio output.

Further, in the case of the main body 1 of the game machine, the operating devices 2 and the recording device 8 are connected to a serial I/O interface (SIO) 31 connected to the peripheral 19. This allows the game manipulation input by the operating devices 2 to be incorporated into the main body 1 of the game machine. At the same time, the game data comprising the content in the process of the game for each of the operating devices 2 is recorded to the recording device 8 when needed.

(2) Video Game Machine According to the Embodiment

Figure 4:
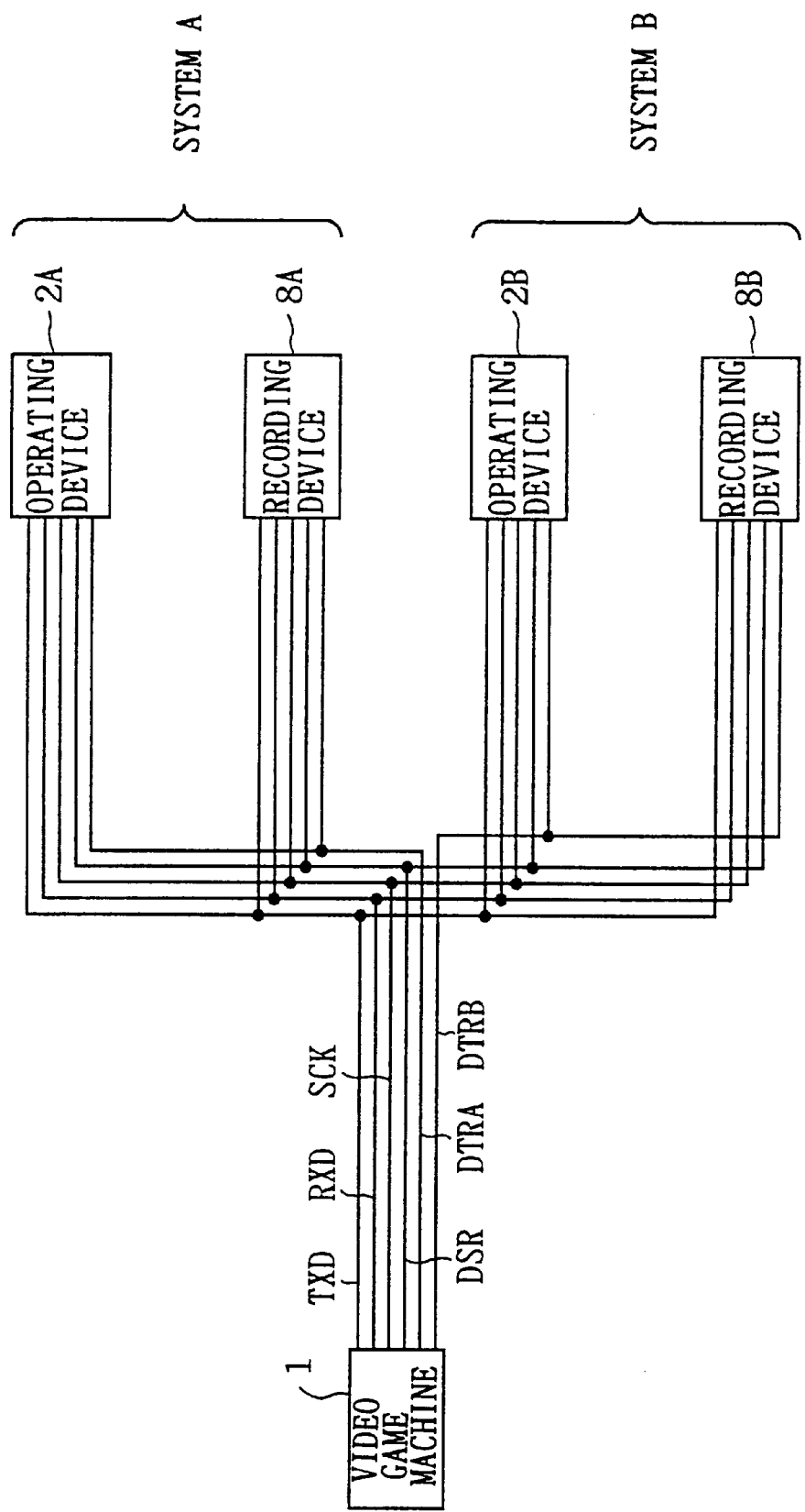
FIG. 4 is a block diagram showing a connection with the main body of the game machine, recording devices, and operating devices.

In this embodiment, as described in FIG. 3, a plurality of operating devices 2 and a plurality of recording devices 8 are connected to the serial I/O interface 31 of the main body 1 of the game machine, so that data can be bidirectionally sent in accordance with a predetermined communication procedure. In actuality, the main body 1 of the game machine, operating devices 2A and 2B and recording devices 8A and 8B are connected as shown in FIG. 4. In this embodiment, two systems A and B operating devices, that is, 2A and 2B, and recording devices 8A and 8B are connected to the main body 1 of the game machine.

The main body 1 of the game machine is connected to the operating devices 2 and the recording devices 8 with a data transmission signal line TXD for sending data respectively to the operating devices 2 and the recording devices 8, a data transmission signal line RXD for sending data from the operating devices 2 and the recording devices 8 to the main body 1 of the game machine, a serial synchronization clock signal line SCK for extracting data from the data transmission signal lines RXD and TXD, and a control line DTR for establishing and interrupting communication by selecting two systems A and B, and a flow-control line DSR for transmitting a large size of data.

Out of the lines, data transmission signal lines TXD, RXD and a flow-control line DSR are connected in parallel from the main body 1 of the game machine to the operating devices 2A and 2B and the recording devices 8A and 8B respectively. Further, since the two systems A and B are connected to the control line DTR, a control line DTRA is connected to the operating device 2A and the recording device 8A of the system A from the main body 1 of the game machine while a control line DTRB is connected to the operating device 2B and the recording device 8B of the system B.

Figure 5:
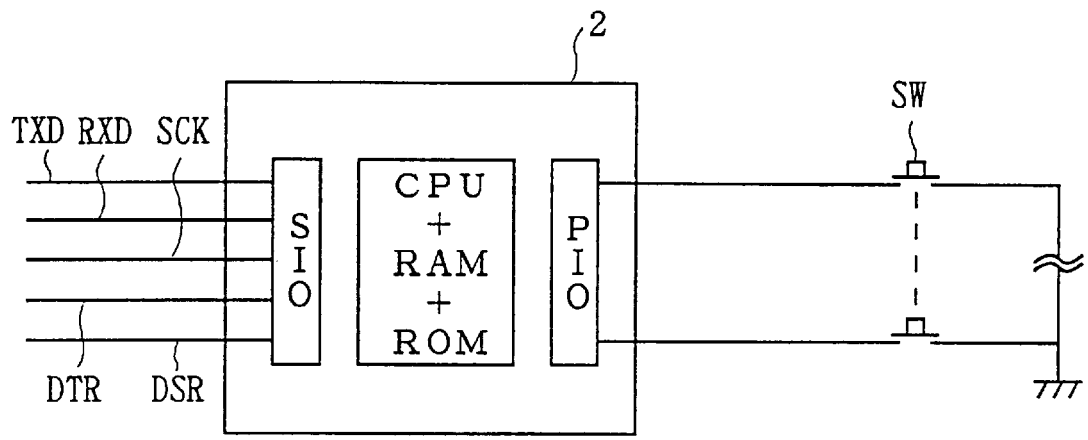
FIG. 5 is a block diagram showing a structure of the operating device.

As shown in FIG. 5, the operating devices 2 incorporate a serial I/O interface (SIO) for serial communication with the main body 1 of the game machine and a parallel I/O interface (PIO) for inputting switch information. The operating devices 2 are composed of a one-chip microprocessor comprising a CPU, a RAM and a ROM, and a plurality of switches SW for inputting operation. This one-chip microprocessor controls the communication procedure.

Figure 6:
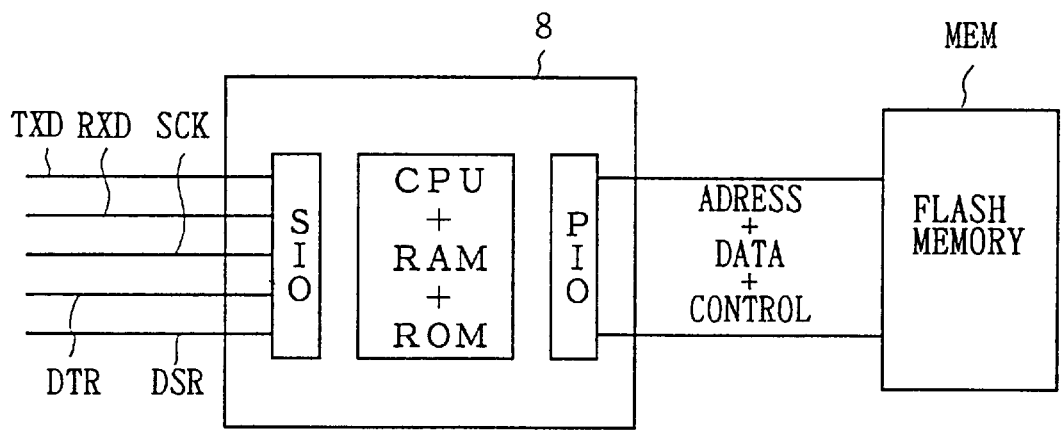
FIG. 6 is a block diagram showing a structure of the recording device.

As shown in FIG. 6, the recording devices 8 incorporates a serial I/O interface (SIO) for serial communication with the main body 1 of the game machine, and a parallel I/O interface (PIO) for inputting data into and outputting data from a memory MEM (for example composed of flash memory) in which data is to be actually memorized. The recording devices 8 are composed of a one-chip microprocessor comprising a CPU, a RAM and a ROM, and a memory MEM. Also in the recording devices 8, the one-chip microprocessor controls the communication procedure.

Figure 7:
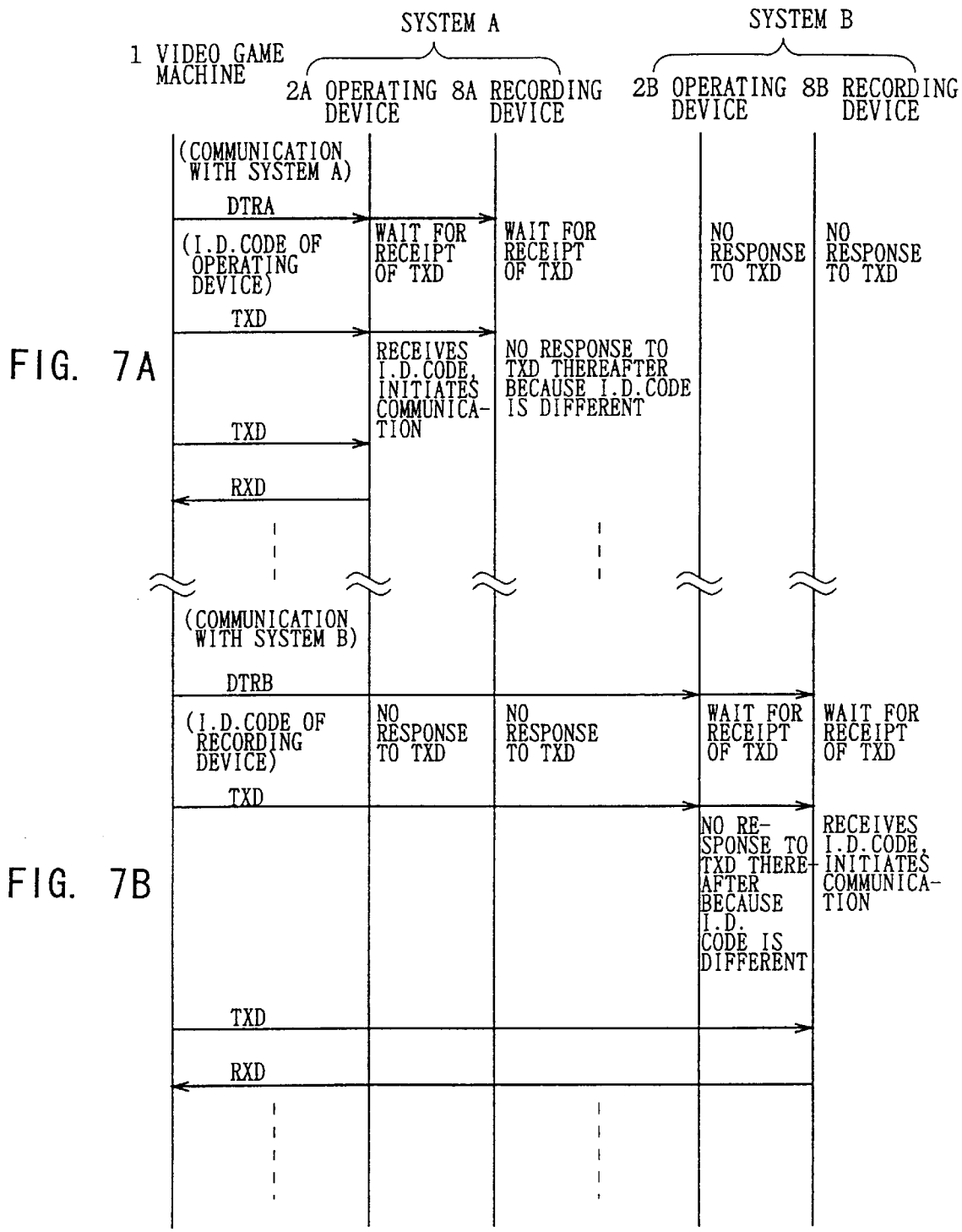
FIGS. 7A and 7B are timing charts explaining a communication procedure with the main body of the game machine, the recording device and the operating device.

Here FIGS. 7A and 7B show a communication procedure in which the main body 1 of the game machine communicates with operating devices 2A and 2B and recording devices 8A and 8B. FIG. 7A shows a procedure in which the main body 1 of the game machine communicates with the operating device 2A of the system A to incorporate, for example, operating data of the game. In this case, the main body 1 of the game machine outputs selection data to the control line DTRA at the outset. As a result, it is confirmed that the operating device 2A and the recording device 8A of the system A are selected by the control line DTRA to produce a state of waiting for the succeeding receipt of TXD.

At this time, the operating device 2B and the recording device 8B of the system B maintain a state of no response to the data sent through the data transmission signal line TXD because the control line DTRB does not change. Subsequently, the main body 1 of the game machine sends to the data transmission signal line TXD an identification code designating the operating device with one byte. This allows the operating device 2A and the recording device 8A of the system A to receive this identification code from the signal line TXD.

As a result, the operating device 2A initiates communication with the main body 1 of the game machine thereafter as soon as the identification code designates the operating device. On the other hand, the recording device 8A assumes a state of no response to data sent through the data transmission signal line TXD as soon as the identification code designates the operating device.

This allows the main body 1 of the game machine to transmit control data or the like of the operating device 2A through the data transmission signal line TXD to the operating device 2A. On the other hand, this allows the operating device 2A to transmit game operation data or the like to the main body 1 of the game machine through the data transmission signal line RXD. In this manner, serial data communication is executed between the main body 1 of the game machine and the operating device 2A. The communication between the main body 1 of the game machine and the operating device 2A terminates when the main body 1 of the game machine outputs selection interruption data through the control line DTRA.

In addition, FIG. 7B shows a procedure in which the main body 1 of the game machine communicates with the recording device 8B of the system B to record, for example, game process data or the like into the recording device 8B. In this case, the main body 1 of the game machine outputs selection data to the control line DTRB at the outset. As a result, it is confirmed that the operating device 2B and the recording device 8B of the system B are selected by the control line DTRB to produce a state of waiting for the succeeding receipt at the TXD.

At this time, the operating device 2A and the recording device 8A of the system A maintain a state of no response to data sent through the data transmission signal line TXD because the control line DTRA does not change. Subsequently, the main body 1 of the game machine sends an identification code designating the recording device with 1 byte to the data transmission signal line TXD. This allows the operating device 2B and the recording device 8B of the system B to receive this identification code from the signal line TXD.

As a result, the recording device 2B initiates communication with the main body 1 of the game machine thereafter as soon as the identification code designates the recording device. On the other hand, the operating device 2B assumes a state of no response to data successively sent through the data transmission signal line TXD as soon as the identification code designate the recording device.

This allows the main body 1 of the game machine to send game process data or the like to the recording device 8B through the data transmission signal line TXD. This then allows the process data to be recorded into the memory MEM of the recording device 8B. On the other hand, for example, record confirmation data or the like is sent to the main body 1 of the game machine through the data transmission signal line RXD from the recording device 8B.

In this manner, serial data communication is executed between the main body 1 of the game machine and the recording device 8B. This data communication between the main body 1 of the game machine and the recording device 8B also terminates when the main body 1 of the game machine outputs selection interruption data through the control line DTRB. In this manner, a serial data communication is executed with a few signal lines and a simple signal connection between the main body 1 of the game machine, operating devices 2A and 2B and recording devices 8A and 8B of the two systems by executing communication procedure using a serial interface.

Figure 8:
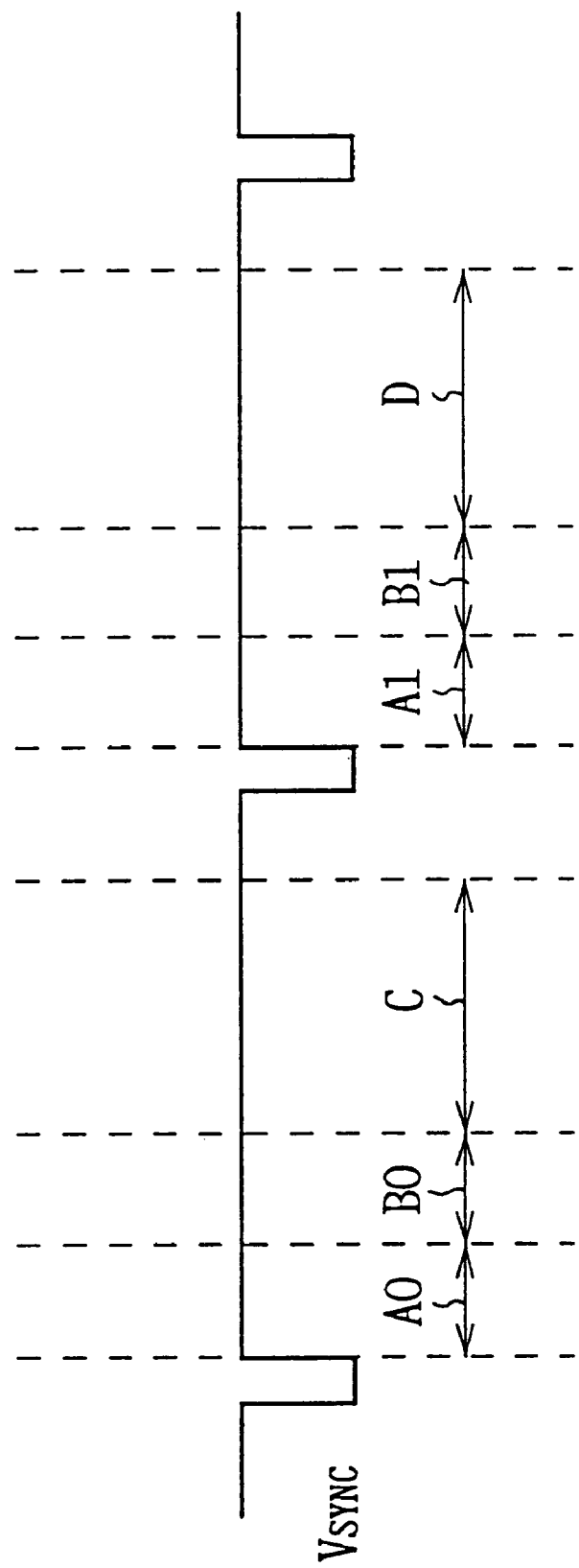
FIG. 8 is a timing chart explaining the rewriting of a screen and a communication timing.

Here, in the case of the video game machine according to the embodiment, the serial data communication between the main body 1 of the game machine, operating devices 2A and 2B, and recording devices 8A and 8B of the two systems is controlled, for example, in accordance with the screen rewriting timing as shown in FIG. 8. The main body 1 of the game machine normally communicates with the operating device 2A of the system A and the operating device 2B of the system B at timings A0 and B0 following the screen rewriting timing (in FIG. 8, a vertical synchronization signal $V_{SYNC}$ designates the screen rewriting timing) thereby respectively providing switch information such as switching operation or the like.

Here, if it is necessary to write data into and read it from the recording device 8A of the system A, communication is executed with the recording device 8A of the system A at a successive timing C. At the same time, when it is necessary to write data into and read it from the recording device 8B of the system B, continuation of succeeding communication will result in the surpass of the following screen rewriting timing. Consequently, in this case communication with the recording device 8B of the system B is executed at a timing D after the termination of the communication with the operating devices 2A and 2B of the systems A and B at timings A1 and B1 following the screen rewriting timing.

In this manner, priority is given to communication between the main body 1 of the game machine that must observe the timing without fail and the operating devices 2A and 2B by controlling the timing of the serial communication, so that a large size of record data such as game process data in the midst of the game or the like is communicated. Thus, data is input to the main body 1 of the game machine from operating devices 2A and 2B while at the same time serial communication can be effectively executed without interruption of the receipt of the operation data from the operating devices 2A and 2B by selecting either the recording device 8A or the recording device 8B that can communicate in an interval of the input of data.

In accordance with the aforementioned structure, the main body 1 of the game machine is connected to the operating devices 2A and 2B with a serial interface so that serial data is bidirectionally communicated in accordance with a predetermined communication procedure, while at the same time, the recording devices 8A and 8B are connected to the serial interface respectively corresponding to the operating devices 2A and 2B and the main body 1 of the game machine reads predetermined data from or writes it into the recording devices 8A and 8B in accordance with the communication procedure, thereby realizing the video game machine that can connect the main body 1 of the game machine thereof to the operating devices 2A and 2B and recording devices 8A and 8B with a simple structure to enable recording data during game operation.

Further, in accordance with the aforementioned structure, the recording devices can be connected to the video game machine with a simple connection with a few signal lines by connecting the recording devices 8A and 8B to a serial interface which connects the operating devices 2A and 2B to the main body 1 of the game machine. Further, since the number of connection line is small, and the connection line is independent of the signal line of the memory MEM used in the recording devices 8A and 8B, the recording devices 8A and 8B can be attached or detached when needed with the power source at the main body 1 of the game machine being turned on which leads to an improvement of the usage of the machine by users.

Further, in accordance with the aforementioned structure, the recording devices 8A and 8B with long communication data and the operating devices 2A and 2B with short communication data can occupy the serial interface so as to be efficiently used in communication for required time by rendering variable the length of communication data with each of the operating devices 2A and 2B, recording devices 8A and 8B and the main body 1 of the game machine simultaneously connected to each other.

(3) Other Embodiment

In the aforementioned embodiment, two operating devices are connected to the main body of the game machine, and two recording devices are connected to each other corresponding to respective operating devices. However, the number of the operating devices are not only limited to two, but three or more operating devices can be connected. The recording device can be connected corresponding to respective operating devices.

Further, in the aforementioned embodiment, a control line for selection for each of the system is provided as the communication procedure. However, the same advantage as that of the aforementioned embodiment can be realized when only corresponding operating device or recording device is allowed to communicate with the main body of the video game machine by adding peculiar identification code respectively to a plurality of operating devices and a plurality of recording devices as transmission data instead of using a control line in the aforementioned embodiment.

Figure 9:
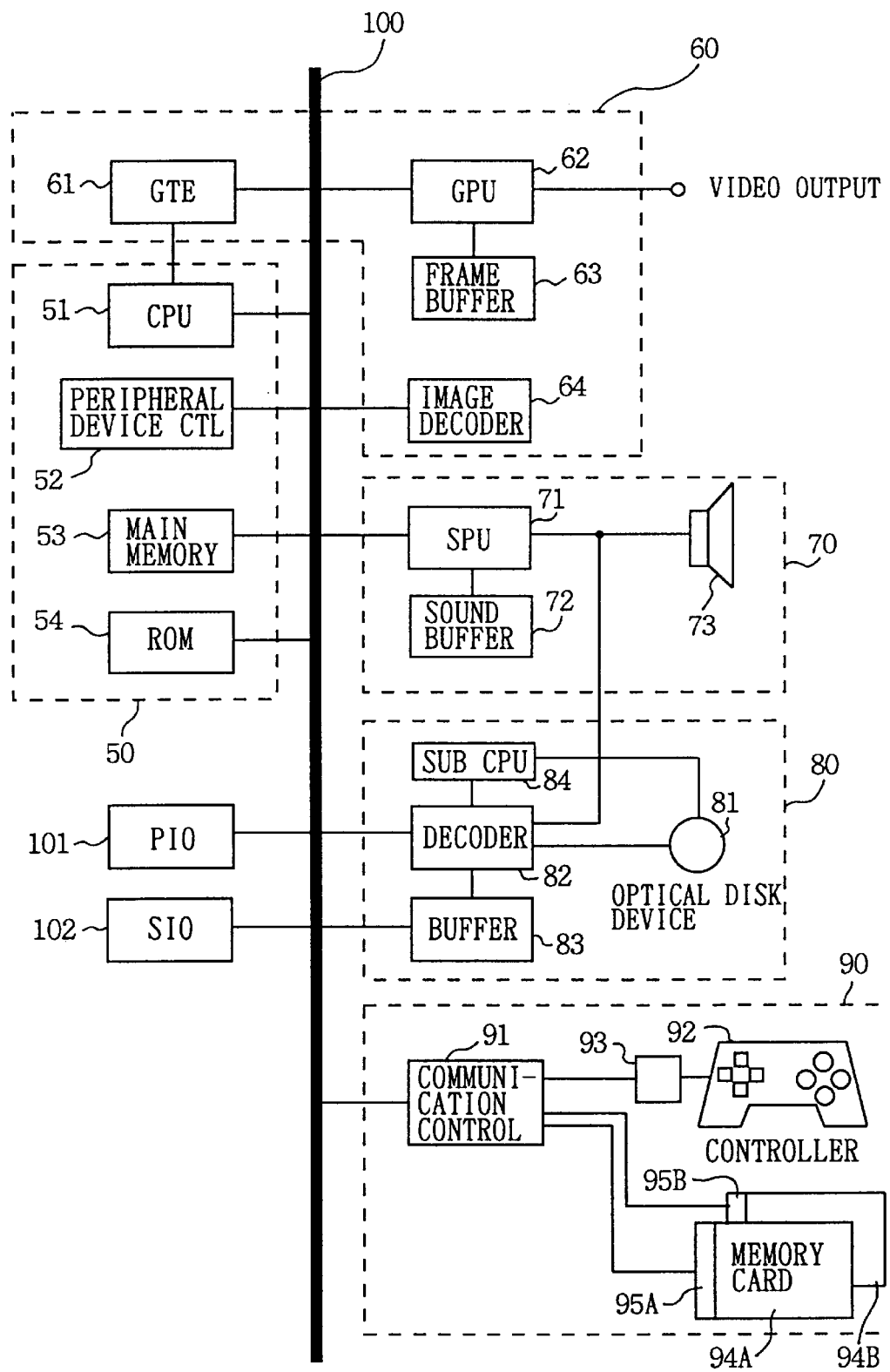
FIG. 9 is a block diagram showing a structure of a video game machine according to this invention.

Further, other embodiment of a video game machine according to this invention will be explained in detail by referring to the drawings. The video game machine according to this invention is constituted, for example, as shown in FIG. 9.

With this video game machine, a game is played in accordance with an instruction from users, for example, by reading and executing a game program memorized in an auxiliary memory means such as optical disk. As shown in FIG. 9, the video game machine provides a control system 50 composed of a central processing unit (CPU) 51 and a peripheral thereof, a graphic system 60 composed of a graphic processing unit (GPU) 62 for depicting images into a frame buffer 63, a sound system 70 composed of a sound processing unit (SPU) 71 or the like for generating music sounds, effect sounds or the like, an optical disk controller 80 for controlling the optical disks which constitute an auxiliary memory means, a communication controller 90 for controlling the input of an instruction from a controller for inputting an instruction from users and the input and output from the auxiliary memory for memorizing the setting of games or the like, and a bus 100 to which the control system 50 through the communication controller 90 are connected.

The control system 50 provides a CPU 51, a peripheral device controller 52 for controlling an interruption and the transmission of a dynamic memory access (DMA), a main memory 53 comprising a random access memory (RAM), and a read only memory (ROM) 54 storing a program such as an operating system for controlling the main memory 53, the graphic system 60, the sound system 70 or the like. The CPU 51 controls the whole machine by executing the operating system memorized in the ROM 54. The CPU 51 comprises 32-bit long RISC CPU.

Then, the video game machine is constituted so that when the power is turned on, the CPU 51 in the control system 50 controls the graphic system 60, the sound system 70 or the like by executing the operating system stored in the ROM 54. When the operating system is executed, the CPU 51 initializes the whole machine such as confirmation of the operation followed by controlling the optical disk controller 80 to execute the program such as games or the like stored in the optical disk. The CPU 51 controls the graphic system 60, the sound system 70 or the like in response to the input from users by executing the program such as games or the like to control the display of images, effect sounds, and the generation of music sounds.

In addition, the graphic system 60 provides a geometry transfer engine (GTE) 61, a GPU 62 for depicting an image in accordance with an depiction instruction from the CPU 51, a frame buffer 63 for memorizing an image depicted by the GPU 62, and an image decoder 64 for decoding image data compressed and encoded by an orthogonal conversion such as discrete cosine conversion or the like.

The GTE 61 provides a parallel arithmetic mechanism for executing a plurality of operations in parallel to execute coordinate conversion, light source calculation, matrix or vector calculations at high speed in response to an arithmetic request from the CPU 51. Specifically, this GTE 61 is constituted so that coordinate calculation is performed with respect to a maximum of 1.5 million polygon per second in the case of flat shading for depicting, for example, a triangle-shaped polygon in the same color. This enables the video game machine to alleviate the load of the CPU 51 while performing a high-speed coordinate calculation.

In addition, the GPU 62 depicts polygons or the like onto the frame buffer 63 in accordance with a depiction instruction from the CPU 51. This GPU 62 can depict about 0.36 million polygons at maximum per second. Further, the frame buffer 63 comprises a dual port RAM. The frame buffer 63 is capable of depicting images from the GPU 62, transmitting data from the main memory, and reading data for the display at the same time. The frame buffer 63 has a capacity of 1M byte. Then the frame buffer is treated as a 16 bit-long 1024 (horizontal)×512 (vertical) pixels matrix.

Further, this frame buffer 63 is provided with a CLUT area memorizing a color lock up table (CLUT) to which the GPU 62 refers to in depicting polygons or the like, and a texture area memorizing a material (texture) to be inserted (mapped) into polygons or the like depicted by the GPU 62 through coordinate conversion at the time of image depiction in addition to a display area to be output as a video output. The CLUT area and the texture area is dynamically changed in accordance with the conversion of the display area.

Incidentally, the GPU 62 is capable of glow shading for determining a color in the polygon with compensation from the color of the tip of the polygon, and texture mapping for sticking a texture memorized in the texture area onto the polygon in addition to the flat shading. In the glow shading or texture mapping, the GTE 61 can calculate the coordinate of 0.5 million polygons at maximum per second.

Further, the image decoder 64 decodes an image data of a static image or a motion image stored in the main memory 53 by the control from the CPU 51 to memorize the image data in the main memory 53. Further, this reproduced image data can be memorized in the frame buffer 63 through the GPU 62 to be used as a background of the image depicted by the GPU 62.

The sound system 70 provides an SPU 71 for generating music sounds, effect sounds or the like based on an instruction from the CPU 51, a sound buffer 72 in which waveform data or the like is recorded by the SPU 71, and a speaker 73 for outputting music sounds, effect sounds or the like generated by the SPU 71.

The SPU 71 provides an ADPCM decoding function for reproducing sound data obtained by subjecting 16-bit long sound data to adaptive differential PCM as a 4-bit long differential signal, a reproduction function for generating effect sounds or the like by reproducing waveform data memorized in the sound buffer 72, and a modulation function or the like for modulating and reproducing waveform data memorized in the sound buffer 72.

By providing these functions, the sound system 70 can be used as sampling sound source for generating music sounds, effect sounds or the like based on waveform data memorized in the sound buffer 72 based on an instruction from the CPU 51.

The optical disk controller 80 provides an optical disk device 81 for reproducing programs, data or the like recorded on optical disks, a decoder 82 for decoding, for example, program recorded with addition of error correction code (ECC), data or the like, and a buffer 83 for heightening the speed of the reading data from the optical disk by temporarily memorizing reproduced data from the optical disk device 81.

Sound data recorded on an optical disk reproduced by the optical disk device 81 includes PCM data obtained by analog-to-digital converting a sound signal in addition to the ADPCM data.

Sound data recorded by representing a differential portion of, for example, 16-bit digital data with 4-bit as ADPCM data is decoded by a decoder 82 followed by being supplied to the SPU 71 and being subjected to digital-to-analog conversion or the like with the SPU 71. After that the sound data is used for driving the speaker 73.

Further, sound data recorded as, for example, 16-bit long digital data as PCM data is decoded by a decoder 82 followed by being used for driving the speaker 73.

In addition, the communication controller 90 provides a communication controller 91 for controlling the communication with the CPU 51 via a bus 100, and a slot 93 to which the controller 92 is connected for inputting an instruction from users and two card connectors 95A and 95B to which two memory cards 94A and 94B are connected as external secondary memory means for secondarily memorizing set data of games or the like, are provided on the aforementioned communication controller 91.

The controller 92 connected to the slot 93 has, for example, 16 instruction keys for inputting an instruction from users to transmit the state of this instruction key in accordance with an instruction from the communication controller 91 by synchronization communication to the communication controller 91 about sixty times per second. Then the communication controller 91 transmits the state of the instruction key at the controller 92 to the CPU 51.

This allows the instruction from users to be input to the CPU 51, and the CPU 51 performs a process in accordance with the instruction from users based on the game programs or the like which is performed.

Here, it is necessary to transmit a large size of image data at high speed in reading programs, displaying, and depicting images between the main memory 53, the GPU 62, the image decoder 64, and the decoder 82. Then, in the video game machine, DMA transmission can be executed to enable direct data transmission between the main memory 53, the GPU 62, the image decoder 64, and the decoder 82 or the like by the control from the peripheral device controller 52 without the intervention of the CPU 51 as mentioned above. This allows alleviation of the load of the CPU 51 by data transmission to enable high speed data transmission.

In addition, the CPU 51 transmits data to be memorized to the communication controller 91 when the set data or the like of the executed game needs to be memorized. The communication controller 91 memorizes data from the CPU 51 to the memory card 94A or the memory card 94B connected to the card connector 95A or the card connector slot.

Here, the communication controller 91 incorporates a protective circuit for preventing an electric breakage. The memory cards 94A and 94B are separated from the bus 100 so that they can be attached to and detached from the machine with the power on. Consequently, when the memory capacity is insufficient, a new memory card can be attached without shutting off the power source of the machine. Thus the game data that should be backed up will never be lost. A new memory card can be attached to write new data into a new memory card.

In addition, as shown in FIG. 6, each of the memory cards 94A and 94B comprises a flash memory MEM which can be accessed at random and which does not require a back up power source. Then each of the memory cards 94A and 94B incorporates a microcomputer MPU having a serial I/O interface (SIO) connected to control lines DTX and DTR through a card connector, data transmission signal lines RXD and TXD, and serial clocking signal line SCK, and a parallel I/O interface (PIO) connected to an address line (ADDRESS) of the flash memory MEM, data line (DATA), and control line (CONTROL). When the memory cards 94A and 94B are connected to the card connector 95A or the card connector 95B, power can be supplied to the microcomputer MPU from the whole machine through the card connectors.

Here, the memory cards 94A and 94B are recognized as a file device identified as a double-digit hexadecimal number designating a port and a card connector from the application. In addition, each of this memory cards 94A and 94B is provided with an automatic initialization function at the time of the file opening. Then, in the microcomputer MPU, the memory cards 94A and 94B are connected to the card connector 95A or the card connector 95B so that the inside state is set to a state of no communication, at the time of the start of power supply from the machine, followed by accepting communication through the communication controller 91.

Then, the CPU 51 on the side of the machine tests the inside state of the microcomputer MPU incorporated in the memory cards 94A and 94B connected to the card connectors 95A and 95B, based on a field representing the inside state in a response packet for confirming a connection from the card to the host in the communication protocol, so that communication to the newly connected memory cards 94A and 94B is identified in the case of no communication in the microcomputer. And then, the structure of the file control data of the memory cards 94A and 95B newly connected, for example such as a file name, a file size, a slot number, a status or the like, is read.

Such a communication protocol allows communication corresponding to the dynamic attachment and detachment of the memory cards 94A and 94B. This allows the two memory cards 94A and 94B to memorize the set state of the game or the like. In addition, the two memory cards 94A and 94B allow direct copying of data and each kind of data can be taken in from the two memory cards 94A and 94B to the machine at the same time.

Figure 10:
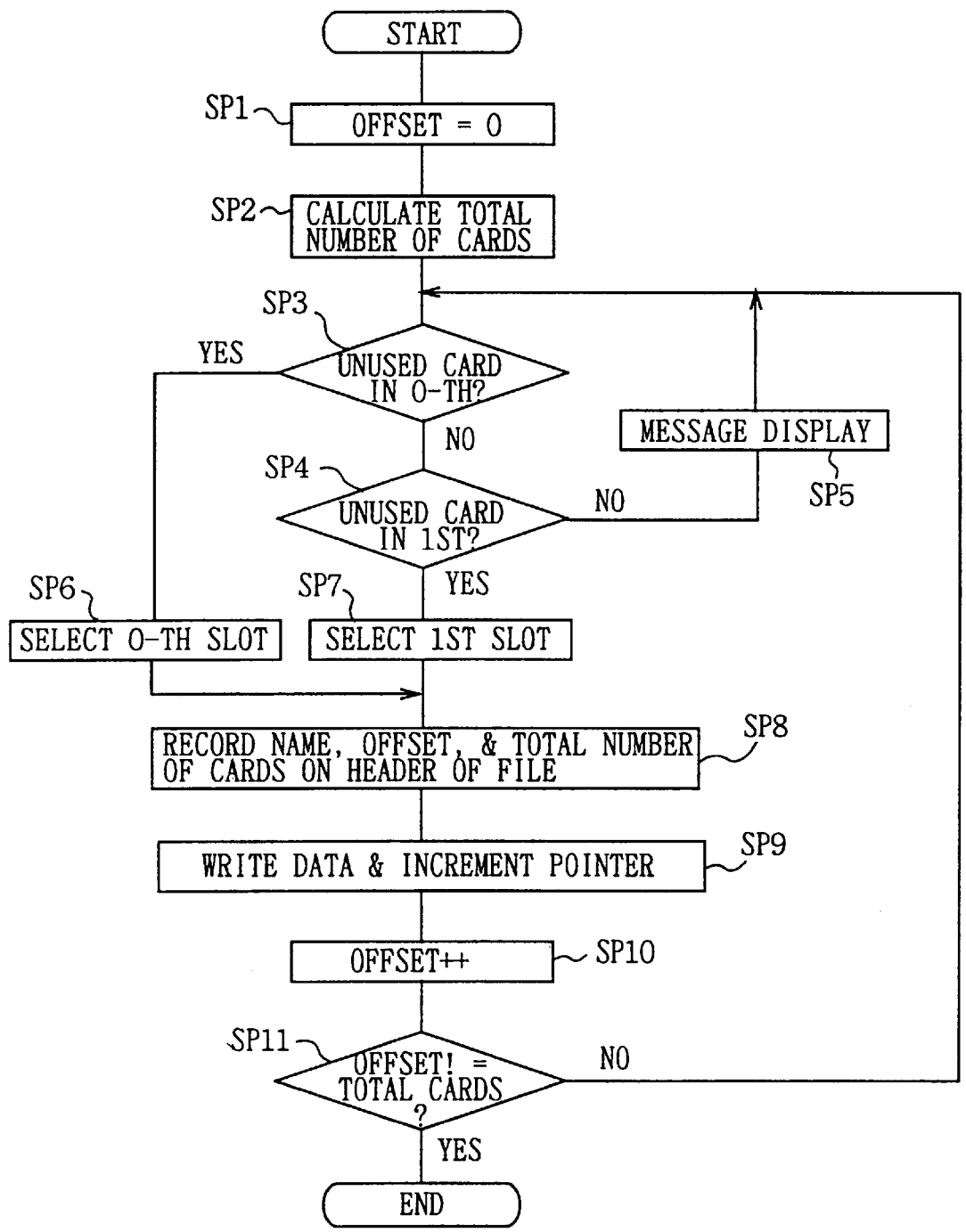
FIG. 10 is a flowchart showing a procedure in which the writing of data into a plurality of memory cards is controlled by a host CPU on the side of the main body of the machine in the video game machine.

Furthermore, the CPU 51 on the side of the machine controls the data writing into a plurality of memory cards connected to the card connector 95A or the card connector 95B for example in accordance with a procedure shown in the flowchart of FIG. 10. In other words, in writing data extending over a plurality of memory cards, an offset designating an order of memory cards is set to "0" at step SP1 followed by calculating the total number of memory cards required from the size of the data to be saved or the quantity of data at step SP2.

Then, at step SP3, it is judged whether an unused memory card, or a memory card vacant in the total memory block is attached in the 0-th card slot assigned to the card connector 95A. When the result of the judgment is "NO", or no unused memory card is inserted into the 0-th card slot, the process proceeds to step SP4. On the other hand, when the result is "YES", or when an unused memory card is inserted into the 0-th card slot, the process proceeds to step SP6.

At the step SP4, it is judged whether an unused memory card, or memory card vacant in the total memory block is inserted into the first card slot assigned to the card connector 95B. If the result of the judgment is "NO", or no unused card is inserted into the first card slot, the process proceeds to step SP5. On the other hand, when the result is "YES", or an unused memory card is inserted into the first card slot, the process proceeds to step SP7.

At step SP5, a message "insert an unused memory card" is displayed to notify users of the necessity of inserting the unused memory card into the 0-th or the first memory card slot, and the process returns to the step SP3.

Then, at step SP6, the 0-th card slot in which the unused memory card is inserted is selected to designate it as a slot in which the data is to be written. Then the process proceeds to step SP8.

Further, at the step SP7, the first card slot in which the unused memory card is inserted is selected to designate it as a slot in which data is to be written. Then, the process proceeds to step SP8. Then, at the step SP8, the name, the offset, and the total number of the cards are recorded on the head area of the file. This allows designation of a memory card in which data is written.

At the succeeding step SP9, data is written, and the pointer on the main memory 53 is changed to the writing front. At the succeeding step SP10, offset is incremented. Then, at the succeeding step SP11, judgment is made as to whether the all writing is completed or not. If the result of the judgment at step SP11 is "NO", or data to be written is present, the process returns to the step SP3, where data writing control continues. If the result of the judgment is "YES", or no data to be written is present, the data writing control is completed.

Figure 11:
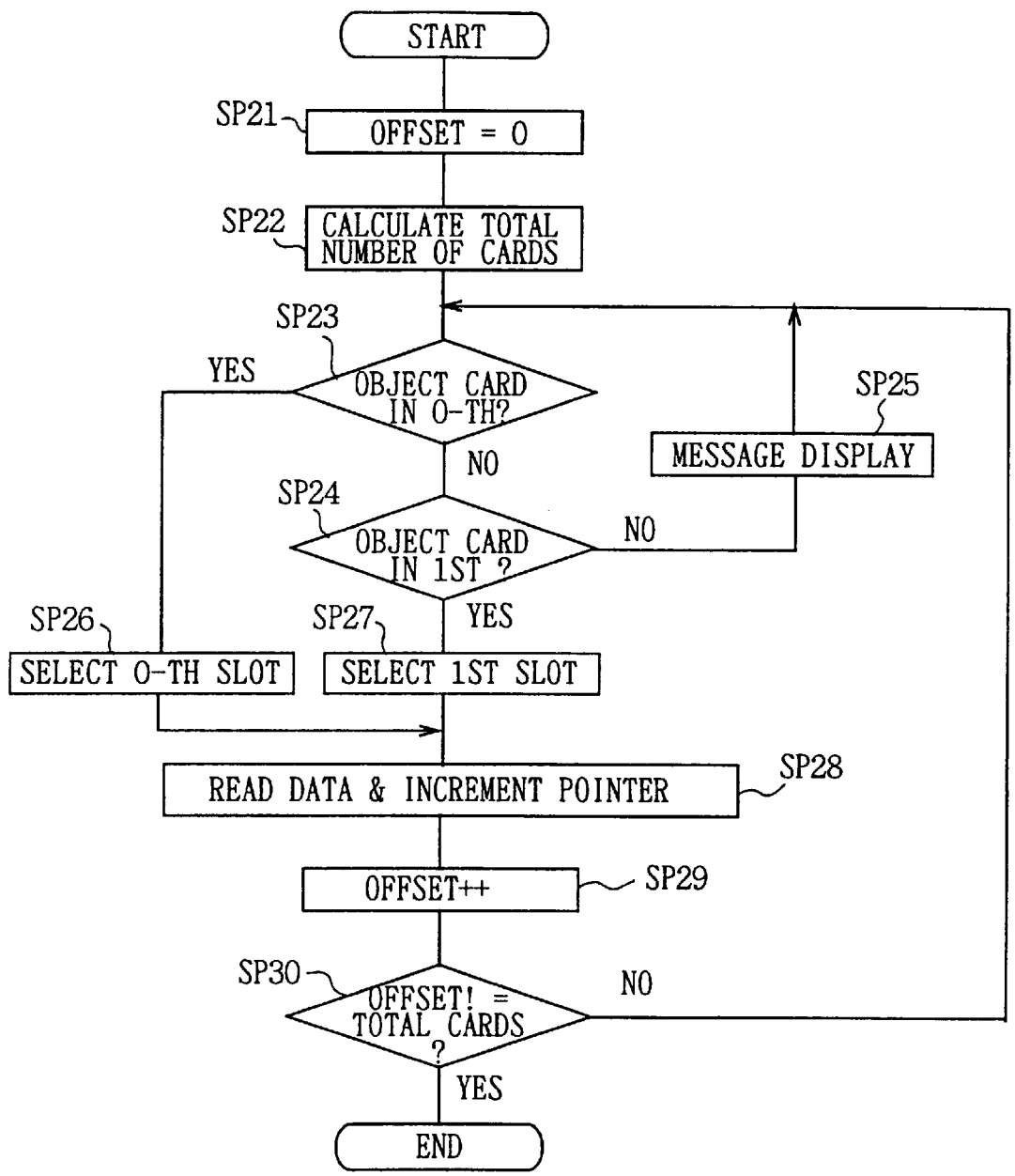
FIG. 11 is a flowchart showing a procedure in which the reading of data from a plurality of memory cards is controlled by the host CPU on the side of the main body of the machine in the video game machine.

Further, the CPU 51 of the machine controls data reading from a plurality of memory cards connected to the card connector 95A or card connector 95B in accordance with a procedure shown in a flowchart in FIG. 11. Namely, when data is read which extends over a plurality of memory cards, the offset designating an order of the memory cards is set to "0" at the outset at step SP21. Then, at step SP22, the total number of memory card required is calculated from the size of the data to be loaded namely the data quantity.

Then at step SP23, judgement is made as to whether an object memory card is inserted into the 0-th card slot assigned to the card connector 95A in which file data to be loaded is written. If the result of the judgment at step SP23 is "NO", or no object memory card is inserted into the 0-th card slot, the process proceeds to step SP24. If the result of the judgment is "YES", namely an object memory card is inserted into the 0-th card slot, the process returns to step SP16.

At the step SP24, judgment is made as to whether an object memory card is inserted into the first card slot assigned to the card connector 95B in which file data to be loaded is written. If the result of the judgment at step SP24 is "NO", or no object memory card is inserted into the first card slot, the process proceeds to step SP25. If the result of the judgment is "YES", or an object memory card is inserted into the first card slot, the process proceeds to step SP27.

Incidentally, the result of the judgement at the step SP23 and SP24 is processed by detecting an agreement of offset recorded in the head area of the file. Then, at the step SP25, a message "insert a memory card with the offset number" is displayed to notify users of the necessity of inserting the object memory card into the 0-th or the first card slot. Then, the process returns to step SP23.

At the step SP6, the 0-th card slot is selected in which the object memory card is inserted to designate it as a slot in which data is read. Then the process proceeds to step SP28. Further, at the step S27, the first card slot is selected in which the object memory card is inserted to designate it as a slot in which data is read. Then, the process proceeds to step SP28.

Then, at step SP28, data is read, the pointer on the main memory 53 is changed to the head of the next reading. At the succeeding step SP29, the offset is incremented. Then, at the next step SP30, judgment is made as to whether all the reading is completed. If the result of the judgment is "NO", or data to be read is present, the process returns to the step SP23 to continue the control of data reading. On the other hand, the result of the judgment is "YES", or there is no data to be read, the control of data reading is completed.

Thus, in the video game machine according to this invention, a plurality of card slots to which memory cards are connected as external secondary memory means are independently controlled by the host CPU 51 via the communication controller 91 connected to the main bus 100 to control the reading and/or writing of data extending over a plurality of memory cards, so that a plurality of small volume memory cards can be used as a large volume external secondary memory means, thereby enabling backing up game software or the like having a large data quantity extending over a plurality of memory cards.

In addition, since each of the memory cards 94A and 94B comprise a flash memory which can be accessed at random and which does not require a back-up power source, data can be stored semi-permanently. Incidentally, the video game machine provides a parallel input/output (I/O) port 101 connected to the bus 100 and a serial I/O port 102. Thus, the video game machine can be connected to the peripherals via the parallel I/O port 101, and the machine can communicate with other video game machines via the serial I/O port 102.

In addition, the applications relating to this invention have been provided as the Japanese Application Nos.05-190764 (Filing Date: Jul. 2, 1993), 05-258625 (Filing Date: Oct. 15, 1993), and 06-115573 (Filing Date: May 27, 1994). Each of the above applications is owned by the assignee of this invention and is hereby incorporated by reference. (The U.S. Patent application corresponding to the three Japanese applications is now in pending.)

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A method for writing file data, in a video game machine having a reproduction function of a video recording medium in which a game is performed by the operation from an operating device connected to a video signal reproducing apparatus provided with a central processing unit, said video signal reproducing apparatus and said operating device being connected by a serial interface to bidirectionally communicate serial data between said video signal reproducing apparatus and said operating device by a predetermined communication procedure, and memory means being connected to respective connectors in said video game machine and having a processor and also being connected to said serial interface respectively corresponding to said operating device to enable the video signal reproducing apparatus to write and/or read predetermined data in and/or from said memory means by said communication procedure, said method comprising the steps of:

setting an offset showing an order of the memory means when data is written in a plurality of memory means;

calculating the necessary total number of memory means required to hold the data from the size of data to be saved;

judging whether or not any of said plurality of memory means are unused;

selecting an unused memory means based on the judgement result;

recording the name of the memory means, offset, and the number of total memory means in a head area of a file;

writing the file data into the selected unused memory means;

incrementing the offset; and judging whether or not all writing of the file data is terminated.

2. The method for writing data according to claim 1, further comprising the step of:

displaying a message for notifying a user to connect an unused memory means to the connector when all of said memory means are used.

3. Apparatus for writing file data, in a video game machine having a reproduction function of a video recording medium in which a game is performed by the operation from an operating device connected to a video signal reproducing apparatus provided with a central processing unit, said video signal reproducing apparatus and said operating device being connected by a serial interface to bidirectionally communicate serial data between said video signal reproducing apparatus and said operating device by a predetermined communication procedure, and memory means being connected to respective connectors in said video same machine and having a processor and also being connected to said serial interface respectively corresponding to said operating device to enable the video signal reproducing apparatus to write and/or read predetermined data in and/or from said memory means by said communication procedure, said apparatus comprising:

a selector for setting an offset showing an order of the memory means when data is written in a plurality of memory means;

a calculator for calculating the necessary total number of memory means required to hold the data from the size of data to be saved;

a judging device for judging whether or not any of said plurality of memory means are unused;

a recorder for recording the name of the memory means, offset, and the number of total memory means in a head area of a file;

a writing device for writing the file data in the selected unused memory into the head of next writing;

an incrementing device for incrementing the offset; and a second judging device for judging whether or not all writing of the file data is terminated.

4. The apparatus of claim 3, further including a display means for displaying a message for notifying user to connect an unused memory means to the connector when all of said memory means are used.

* * * * *